United States Patent [19]

Poli et al.

[11] Patent Number: 5,141,014
[45] Date of Patent: Aug. 25, 1992

[54] BREAKAWAY COUPLING

[75] Inventors: E. Leonard Poli; Mervin L. Carder, both of Fenton, Mo.

[73] Assignee: M. Carder Industries, Inc., Fenton, Mo.

[21] Appl. No.: 706,375

[22] Filed: May 28, 1991

[51] Int. Cl.⁵ .................. F16K 17/40; F16L 37/32
[52] U.S. Cl. ............... 137/68.1; 137/614.04; 285/2; 285/4; 403/2
[58] Field of Search ............ 137/68.1, 614.04; 285/2, 3, 4; 403/2

[56] References Cited

U.S. PATENT DOCUMENTS

| 1,345,571 | 7/1920 | Yates | 137/614.04 |
|---|---|---|---|
| 1,862,111 | 7/1932 | Conran | 137/68.1 X |
| 2,108,714 | 2/1938 | Hirsch et al. | 137/614.04 |
| 2,178,929 | 11/1939 | Cline | 403/2 |
| 3,178,205 | 4/1965 | LeBus, Sr. | 285/4 X |
| 4,361,165 | 11/1982 | Flory | 137/69 |
| 4,501,287 | 2/1985 | Thompson | 137/68 R |
| 4,614,201 | 9/1986 | King et al. | 137/68.1 |
| 4,728,124 | 3/1988 | Righi et al. | 285/2 |
| 4,854,338 | 8/1989 | Grantham et al. | 137/68.1 |
| 4,899,786 | 2/1990 | Morris et al. | 137/637.05 |
| 4,921,000 | 5/1990 | King et al. | 137/68.1 |

Primary Examiner—John Rivell
Attorney, Agent, or Firm—Polster, Lieder, Woodruff & Lucchesi

[57] ABSTRACT

A breakaway coupling for joining two hoses includes a main body and an end body which are telescopically connected. A frangible link holds the two parts together. The link is inserted in a recess formed in a surface of the coupling which spans the junction of the bodies. The link is subject only to tensile forces and is formed to break at across the center of the link, where the two bodies abut each other. Each body includes a check valve. When the two bodies are connected, the valves urge against one another to open the valves. The urging of the valves against one another also exerts a tensile force on the link to hold it in its recess. A spacer separates the valves so that high pressure flow will not close the upstream valve.

15 Claims, 2 Drawing Sheets

BREAKAWAY COUPLING

BACKGROUND OF THE INVENTION

This invention relates to breakaway couplings for hoses, and in particular, to a field repairable breakaway coupling.

When filling cars at gas stations, customers have been known to accidentally drive away with the gasoline nozzle still in the car. To prevent damage to the gasoline pump, breakaway couplings have been inserted into the hose which connects the nozzle to the gasoline pump.

Many breakaway couplings have relied on shear pins to hold the two coupling sections together One such breakaway coupling is shown in U.S. Pat. No. 4,361,165, to Flory. Regular use of this type of coupling, however, causes wear along the pin's shear line which can lead to premature failure of the pin. Such wear is caused by pulling and releasing of the hose and line shock resulting from the shutting off of the nozzle.

Breakaway couplings which rely more on tensile forces, rather then shear forces, to effect the uncoupling overcome this problem. One solution is shown in U.S. Pat. No. 4,854,338, to Grantham and U.S. Pat. No. 4,899,786, to Morris et al. Both of these utilize a frangible sleeve. To make the coupling requires that the sleeve be molded, roll formed or pressed into annular grooves on the body 2 of the coupling. Such a design requires special equipment and is thus not easily repaired in the field.

Another breakaway coupling which is uncoupled by tensile forces is shown in U.S. Pat. No. 4,501,287 to Thompson. In this coupling, a pin or stud holds a ball in a detent, and the ball and detent hold the two coupling halves together When the pin breaks due to tensile forces, the ball falls out of the detent, allowing the two halves to separate. This coupling has many parts. It is complicated and expensive to make and difficult to repair in the field.

U.S. Pat. Nos. 4,614,201 and 4,921,000, both to King et. al., show another coupling which relies on tensile stresses In these couplings, the two halves are in an abutting relationship. The coupling may thus cock or bend at the junction of the coupling halves when the frangible element breaks. This could lead to damage of one or both of the coupling halves, requiring that the coupling be replaced.

SUMMARY OF THE INVENTION

One object of the invention is to provide a breakaway coupling which is easily repaired in the field.

Another object is to provide such a coupling which is uncomplicated and economical to produce.

Other objects of this invention will be apparent to those skilled in the art in light of the following description and accompanying drawings.

In accordance with the invention, generally stated, there is provided a breakaway coupling which is inserted in a hose or used to connect two hoses. The coupling includes a main body having a recess formed on a surface thereof at one end thereof and an end body having a recess formed on a surface thereof. The two recesses are mirror images of each other and are connected when the end body and main body are connected to define a single recess in the coupling A frangible link which is received in the recess of the two bodies secures the main body and end body together Each recess is preferably semi-circular to form a circular recess the said main body and end body are joined. The link is preferably ring shaped The link may also take on a plurality of other shapes which have an axis of symmetry and which could act to hold the two bodies together The symmetry of the link causes the tensile forces to be focused across the center of the link. The link will thus break where the two bodies join each other.

A valve is placed in each of the bodies. The valve functions to bias the bodies apart to exert a tensile force on link to hold the link in the recesses when said main body and said end body are coupled. The valves in the two bodies are check valves. Each valve includes a valve member moveable between an opened and a closed position and a spring to bias each of the valves closed. The valve members are in an abutting relationship when the end body and main body are coupled, thereby opening the valves. The springs, acting on the valve members, act to bias the two bodies apart, as indicated above. A spacer is placed between the two valves so that a high pressure flow will not overcome the force of the downstream spring and close the upstream valve.

DESCRIPTION OF THE PREFERRED EMBODIMENT

Figure 1:
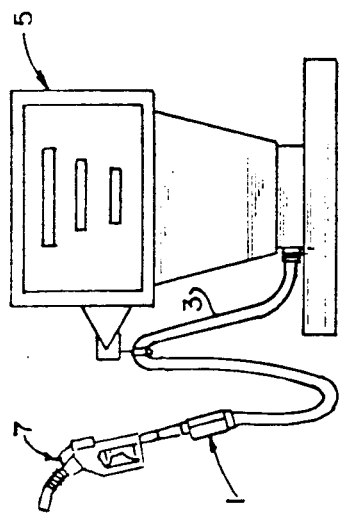
FIG. 1 is an elevational view of a gasoline pump with a breakaway coupling inserted in the line from the pump to its nozzle.

Referring to FIG. 1, reference numeral 1 indicates one illustrative embodiment of a breakaway coupling which is inserted in a hose 3 which leads from a gasoline pump 5 to a pump nozzle 7.

Coupling 1 includes a main body 9 and an end body 11 both of which are preferably made of aluminum. End body 7 includes a nose section 15 and a flange 17. Nose 15 has a pair of annular grooves 19 and 21 which receive O-rings 22 and 23. The interior of nose 15 defines a check valve 24 and includes a flowpath 25 having an inlet 26, an outlet 27 and a valve seat 29. A check ball 31 is biased to be normally closed by a spring 33. Spring 33 is seated against a shoulder 35 in nose 15. Flange 17 is internally threaded, as at 37, the outlet 27 of flowpath 25, to allow for connection of end body 11 to hose 3.

Main body 9 includes internal threads 41 at one end thereof to allow for connection to hose 3 A valve 43 is forward of threads 41. Valve 43 is identical to valve 24 of end body 11 and includes a flowpath 45 having an inlet 47 and an outlet 49. A valve seat 51 is located at valve outlet 49. A check ball 53 is biased to be normally seated against seat 51 by a spring 55. Like spring 33, spring 55 is seated as a shoulder 57 of valve 43.

Figure 4:
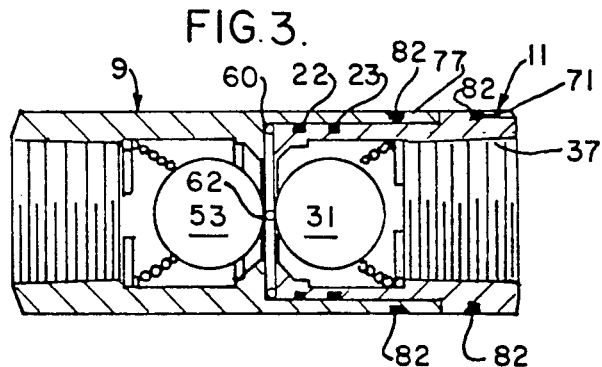
FIG. 4 is a cross-sectional view of the coupling when coupled.
Figure 5:
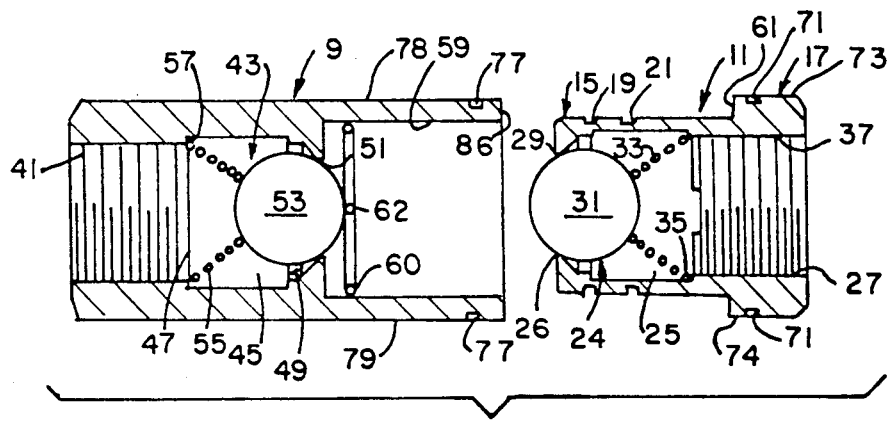
FIG. 5 is an exploded, cross-sectional view of two coupling halves when apart.

Exit 49 of valve 43 opens into a chamber 59 which telescopically receives nose 15 of end body 11. When the two bodies are brought together, valve balls 31 and 53 press against each other to open valves 24 and 43 as seen in FIG. 4. The valves are mirror images of each other. They each have an inner diameter of about one inch preferably about 1.225". Shoulders 35 and 57 are about 0.1". Seats 29 and 51, which define the inlet and outlet of valves 24 and 43, respectively. Each seat has openings of about 0.815". O-rings 22 and 23 provide fluid tight seals between nose 15 and chamber 59. Chamber 59 is as deep as nose 15 is long. This allows for the forward edge 61 of flange 17 to butt up against the edge 86 of main body 3. A spacer 60 is placed between end body nose 15 and the rear wall of main body chamber 59. The spacer 60 limits movement of the balls 31 and 53, to prevent flowing liquid from overcoming the force of the downstream spring and closing the upstream valve ball. Specifically, spacer 60 has a finger 62 which extends across the middle thereof Finger 62, as seen in FIG. 4, holds balls 31 and 53 apart. When the two bodies are separated, the spacer 60 is freed and does not limit movement of balls 31 and 53. Spacer 60 is slightly smaller in diameter than the diameter of chamber 59, thus, does not interfere with the closing of either valve.

Figure 3:
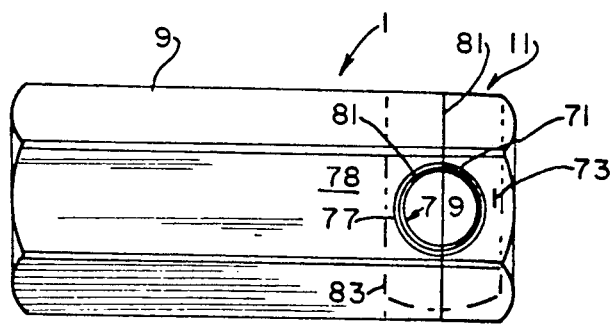
FIG. 3 is a plan view of the breakaway coupling.

End body flange 17 includes a pair of semi-circular recesses 71 formed on opposite generally planar surfaces 73 and 74. The recess is formed so that the ends 75 and 76 of the and 6. Recesses 77 are also formed on opposite planar surfaces 78 and 79 of main body 9. Recesses 77 are similarly formed at the edge of main body 9 so that when the two bodies are brought together, as in FIG. 3, recesses 71 and 77 form a circular recess 79. Circular recess 79 has an outer diameter of about 0.625", an inner diameter of about 0.500", and a depth of about 0.062". The junction 81 between the two bodies defines an axis of symmetry about recess 79. A frangible link 82, in the form of a ring, preferably made of 360 brass, is received in recess 79 to hold the coupling 1 together. The force of springs 33 and 55 pushing against each other put a tensile stress on ring 82 to hold it in recess 79. To prevent the forces of springs 33 and 55 from urging rings 82 out of recess 79, a thin cover band 83 extends around the coupling 1 to cover recesses 79. Band 83 can be made of rubber, metal, label material or any other material which is strong enough to hold the ring in place and can withstand the weather.

An aligning pin 84 is received in bores 85 in flange wall 61 and main body wall 86 to aid in aligning recesses 71 and 77 when connecting bodies 9 and 11.

Ring 82 is preferably cut from tubing, but may also be stamped. It is preferably made of brass When made, ring 82 is cut to a thickness so that it will break at a predetermined tensile stress A stress of preferably about 325 lbs. on ring 82 will cause it to break. The ring is given dimensions to accommodate break at this force. The fact that end body 5 is telescopically received in main body 3 will prevent the two bodies from cocking relative to one another and thus ensure that only tensile stresses will act on ring 82.

Ring 82 has an outer diameter of about 0.605" and an inner diameter of about 0.510", producing an annular width of about 0.095". It 82 has a depth of about 0.024". These dimensions will give the ring a tensile strength of about 325 lbs. when made of 360 brass, as is preferred. Obviously, if the ring is made from other material, one or all of the dimensions would have to be changed.

In the manufacture of the coupling 1, the bodies 9 and 11 are mated with aligning pin 84 and bore 85 and held while a first circular groove is machined into flat outer faces 73 and 78 of the bodies 9 and 11, thereby forming one groove 79. A ring 82 is then dropped into the groove 79, and the mated bodies 9 and 11 are turned over to machine a second circular groove 79 on surfaces 71 and 79 of the two bodies for the other ring 82. Perfect alignment of both grooves is thereby easily achieved.

Ring 82 may optionally be notched. This notch is aligned with junction line 81 when the ring is placed in recess 79 to create a predetermined breaking point in the ring. The breaking point is preferably across the diameter of the ring 82. Even if the ring is not notched, as described above, the geometry of the ring 82 causes the tensile forces to be focused across the diameter of the ring. Thus, the ring will break across its diameter. Because the diameter of the ring is aligned with junction line 81, the ring will break across line 81. This provides for a cleaner break and uncoupling of the two bodies. It also reduces any structural damage which may be caused to coupling 1 when it is separated by the breaking of rings 82.

In operation, when an axial pull exceeds the tensile strength of rings 82, they will break causing bodies 9 and 11 to be pulled apart. As the two bodies are pulled apart, springs 33 and 55 seat balls 31 and 53 to close check valves 24 and 43. The springs have sufficient strength to essentially instantaneously close the valves. This ensures that there will be little or no leakage of fluid due to the breaking of the coupling.

To repair the coupling, an attendant should first inspect both bodies for damage resulting from the break and striking of the pavement If the bodies are not damaged, O-rings 22 and 23 are removed from grooves 19 and 21 and are discarded. The cover band 83 is also discarded. The two bodies should be cleaned to prevent any foreign debris from entering the gasoline line. New O-rings are then placed in grooves 19 and 21. The new O-rings are preferably lubricated. A new cover band 83 is installed over main body 9, away from groove 77, and a new spacer is placed in chamber 59. End body nose 15 is then inserted into main body chamber 59 and the two bodies are pressed together so that a first new ring 82 may be inserted into one of the recess 79. A second new ring 82 is then inserted into the other recess 79 and cover band 83 is placed over the rings 82. Thus to repair the coupling 1, all that is needed is a supply of O-rings, spacers, and link rings. Field repair is thus quite easy and does not require any training, specialized equipment, or a plurality of extra parts.

Figure 7:
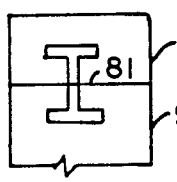
FIGS. 7-8 show alternative configurations for a frangible link of the coupling.
Figure 8:
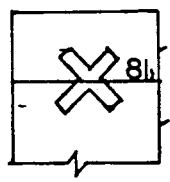
Figure 9:
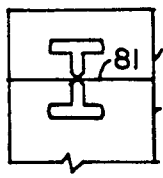
Figure 10:
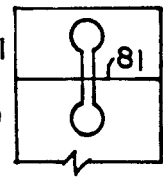
Figure 11:
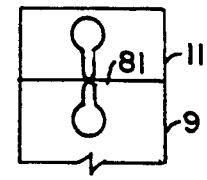

As seen in FIGS. 7-9, link or ring 82 can take on several other shapes which have an axis of symmetry. As seen, the link could be in the shape of an "I", an "X", or a dumb bell with planar discs on either end of a central portion. The "I" and dumb bell shaped links could be notched, as shown in FIGS. 9 and 11 to create a weak point in the link. With these shapes, the shape of recess 79 would correspondingly be changed. The ring shaped link is preferred. It is easier to both create the ring and the recess 79. To create the recess 79, a circle need only be milled in coupling 1. If the alternate shapes are used for the link, several milling cuts are needed.

Numerous variations, within the scope of the appended claims, will be apparent to those skilled in the art in light of the foregoing description and accompanying drawings For example, rather than inserting rings 82 in recesses formed in the surface of coupling 1, protuberances, circular in plan, could be formed which cross junction line 81, one half of the protuberances being formed on each body. The rings 82 could then placed around the protuberances. This design however is not preferred because it does not present a flat surface and dirt or other debris can accumulate under ring 82 causing it to be lifted off coupling 1 causing the coupling to separate. Rather than using two rings, one ring could be used in conjunction with a pin. The tensile strength of 325 lbs. is preferred for use with a 1" diameter hose. If a ¾" diameter hose is used, the ring 82 should be designed to break under a tensile force of about 225 lbs. For the ¾" hose, the ring has the same dimensions as the set out above, except that it has a depth of about 0.018" instead of 0.024". The coupling can be similarly modified for use on a 1.5" fuel oil hose by appropriately changing the depth of the ring 82. The same design can be used with smaller and larger hoses by appropriately changing the size of the ring. The coupling can further be modified for use with a vapor recovery system for a gasoline pump by providing appropriate passages for the vapor line and appropriately modifying the depth of the ring 82. The coupling is not restricted to use in gasoline or fuel oil hoses, but may be used for with hoses which carry any liquid or gas such as propane, natural gas, etc. The links 82 could be scored, rather than notched to produce a weak point in the link. However, when a ring is used, if it is notched or scored, the notch or score must be aligned with junction line 81 for the ring to break under the appropriate load If the notch or score is not so aligned, more than the rated load may be needed to break the link. These variations are merely illustrative.

We claim:

1. A breakaway coupling comprising
a main body having a semi-circular recess formed on a surface thereof at one end of said surface;
an end body having a semi-circular recess formed on a surface thereof corresponding to said main body recess, said main body recess and said end body recess forming a circular recess when said main body and end body are joined;
frangible means for securing said main body and said end body together; said frangible means comprising a ring which is received in said recess of said main body and said end body;
valve means in each of bodies and;
biasing means for biasing said bodies apart, said biasing means exerting a tensile force on said ring to hold said ring in said recesses when said main body and said end body are coupled.

2. The breakaway coupling of claim 1 wherein said valve means comprises a check valve in each said body; each said valve comprising a valve member moveable between an opened and a closed position and a spring to bias each said valve closed;
said valve members being in an abutting relationship when said end body and main body are coupled, thereby opening said valves;
said biasing means comprising said valve means.

3. The breakaway coupling of claim 1 wherein said main body and said end body have a plurality of recesses formed on surfaces thereof, and wherein said frangible means comprise a plurality of rings received in said recesses.

4. A breakaway coupling comprising a first body having an axial flow passage therethrough;
a second body having an axial flow passage therethrough;
closure means in at least one of said first body and said second body for closing its axial flow passage when said first body and said second body are separated; and
frangible link means for securing said first body and said second body together with the flow passages thereof axially aligned in fluid communication; characterized in that said frangible link means comprises a flat strip in the form of a circular ring lying in a plane parallel to the axial flow passage of the first and second bodies, the ring extending across a line of juncture of the first and second bodies.

5. The breakaway coupling of claim 4 wherein said first body is telescoped into said second body, and further including biasing means for biasing said bodies apart, said biasing means exerting a tensile force on said link means when said first body and said second body are coupled.

6. A breakaway coupling comprising
a first body having an axial flow passage therethrough;
a second body having an axial flow passage therethrough;
closure means in at least one of said first body and said second body for closing its said axial flow passage when said first body and said second body are separated;
frangible link means for securing said first body and said second body together with the flow passages thereof axially aligned in fluid communication; characterized in that said frangible link means comprises a circular ring lying in a plane parallel to the axial flow passage of the first and second bodies, the ring extending across a line of juncture of the first and second bodies.

7. The coupling of claim 6 wherein said first body is telescoped into said second body, and further including biasing means for biasing said bodies apart, said biasing means exerting a tensile force on said link means when said first body and said second body are coupled.

8. The coupling of claim 7 wherein said ring lies against an axial outside surface of each of said first and second bodies.

9. The breakaway coupling of claim 6 wherein said frangible link means comprises at least one other circular ring lying in a plane parallel to the axial flow passage of the first and second bodies, the ring extending across a line of juncture of the first and second bodies and being spaced from said first ring.

10. The breakaway coupling of claim 6 including closure means in said first body for closing its axial flow passage when said first body and said second body are separated and closure means in said second body for closing its axial flow passage when said first body and said second body are separated.

11. The breakaway coupling of claim 10 wherein said closure means comprise balls.

12. The breakaway coupling of claim 11 wherein said biasing means comprise springs biasing said balls toward each other when said first body and said second body are coupled.

13. The breakaway coupling of claim 10 including a spacer member between said closure means in said first body and said closure means in said second body, the spacer member being trapped between said first body and said second body, both said closure means being in an abutting relationship with said spacer member when said first body and second body are coupled.

14. The breakaway coupling of claim 13 wherein said closure means comprise a ball in said first body and a ball in said second body.

15. The breakaway coupling of claim 14 wherein said biasing means comprise springs biasing said balls toward each other when said first body and said second body are coupled.

* * * * *

UNITED STATES PATENT AND TRADEMARK OFFICE
CERTIFICATE OF CORRECTION

PATENT NO. : 5,141,014

DATED : August 25, 1992

INVENTOR(S) : Mervin L. Carder; E. Leonard Poli

Figure 2:
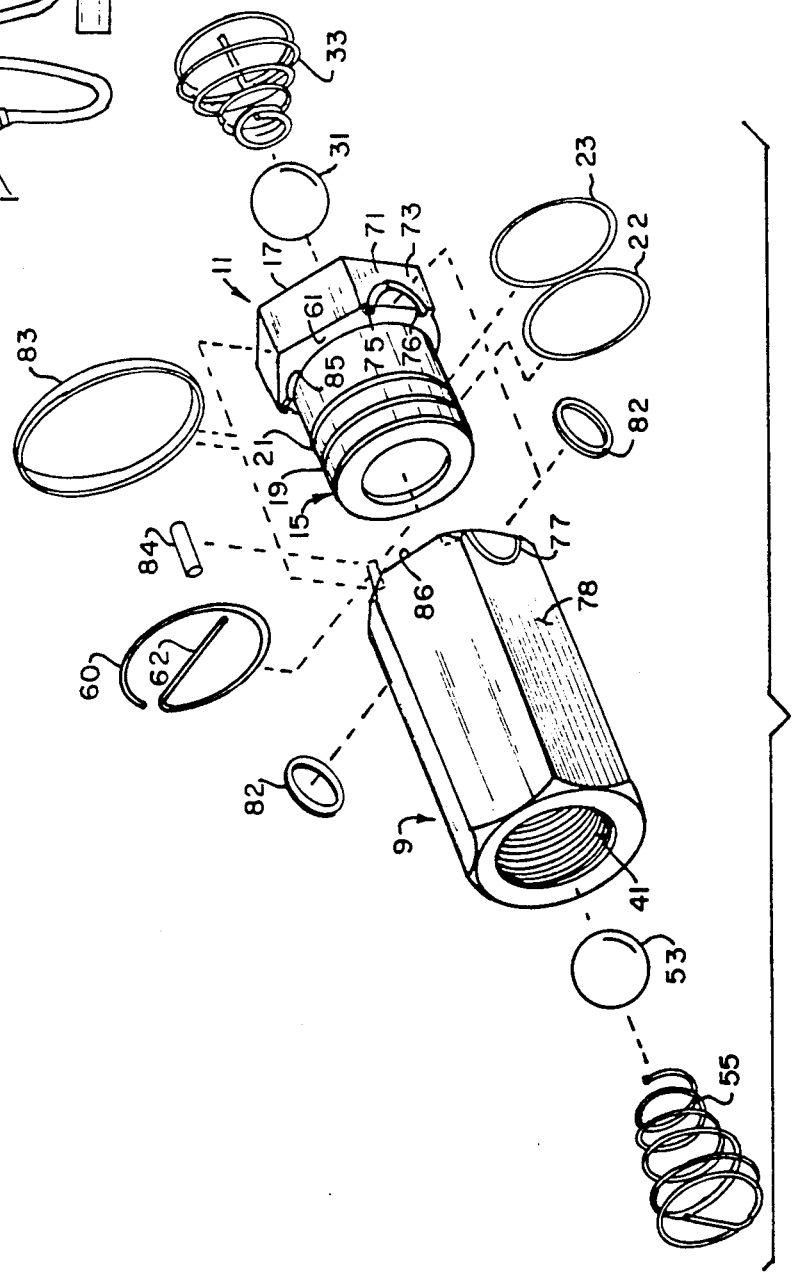
FIG. 2 is an exploded view of the breakaway coupling of the present invention.
Figure 6:
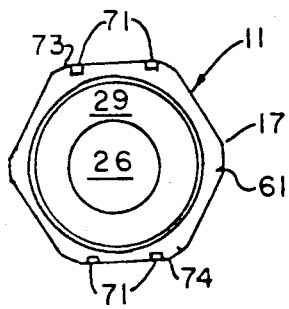
FIG. 6 is a front plan view of an end body of the coupling, taken along line 6—6 of FIG. 5.

It is certified that error appears in the above-identified patent and that said Letters Patent is hereby corrected as shown below:

Col. 3, line 30 is "of the and 6" should be --of the recess open into edge 61 of flange 17, as is best shown in Figs. 2 and 6--.

Signed and Sealed this

Ninth Day of November, 1993

*Attest:*

BRUCE LEHMAN

*Attesting Officer*      *Commissioner of Patents and Trademarks*